Aug. 17, 1954   J. W. WURTZ ET AL   2,686,747
METHOD OF MANUFACTURING ELASTIC SEALING MATERIAL
Filed March 24, 1950

JOHN W. WURTZ
AND
FRED A. GREENWALD
INVENTOR.

BY Vandeveer Voorhees
ATTY.

Patented Aug. 17, 1954

2,686,747

UNITED STATES PATENT OFFICE 2,686,747

METHOD OF MANUFACTURING ELASTIC SEALING MATERIAL

John W. Wurtz, San Gabriel, and Fred Alton Greenwald, South Gate, Calif., assignors to National Motor Bearing Co., Inc., Redwood City, Calif., a corporation of California Application March 24, 1950, Serial No. 151,766

6 Claims. (Cl. 154—84)

This invention relates to a method of manufacturing an improved type of sealing material, such as weatherstripping. The sealing material itself is claimed in a divisional application, Serial No. 278,856, filed March 11, 1952.

The invention solves problems in connection with the manufacturing of weatherstrip material and other similar members for sealing such structures as the bodies of vehicles and the cabins of airplanes against egress or ingress of air. One such problem has been that the wide range of temperatures, from very low to very high, has caused ordinary sealing materials to become embrittled and hardened. Thus, in the sealing of airplane cabins, it is desirable that the sealing material maintain its elasticity at temperatures as low as —60° F. to —80° F., which are encountered at high altitudes. The same material must also withstand temperatures at low altitudes varying from 100° F. to 150° F. at some seasons to as high as 200° F to 300° F. at other seasons. Rubber and similar materials heretofore in use were unsatisfactory.

We have provided a satisfactory sealing product for this service from an elastic organic silicone compound formed into a cellular structure or sponge. For this purpose we prefer to use the rubber-like polymethyl alkylsiloxanes retained in a suitable jacketing material for support and to prevent abrasion of the relatively weak polysiloxane compound. Previous attempts to use this material in solid form for sealing purposes have been unsuccessful owing to the low resilience of the polysiloxanes, resulting in serious deformation under prolonged stress. We have solved this problem by incorporating inert gases in the polysiloxane in a cellular structure as hereinafter described. Methods heretofore in use in connection with the manufacture of cellular rubber products were found unsatisfactory when applied to the polysiloxanes; so the new method of this invention had to be devised.

Figure 1:
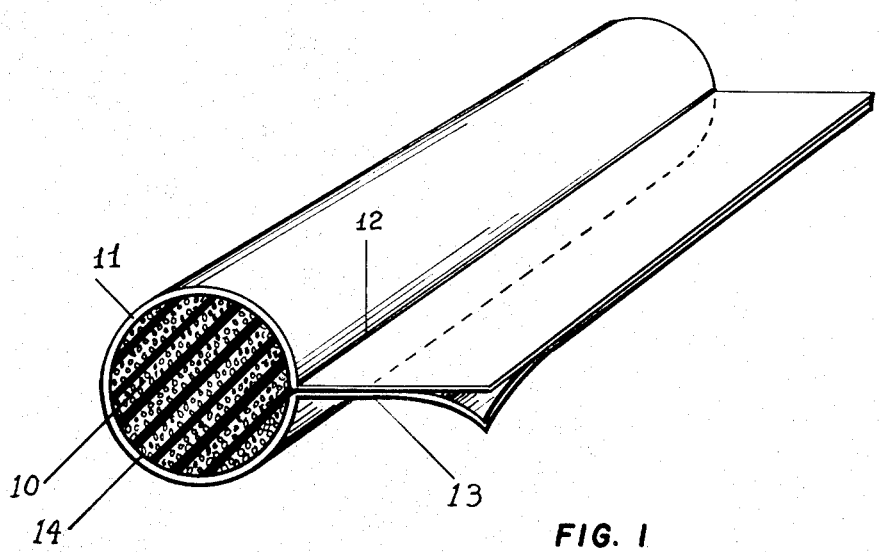
Figure 2:
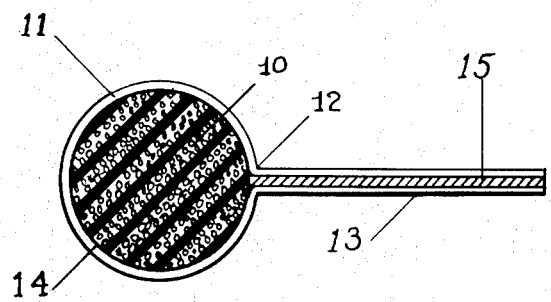

The invention is described in a drawing which shows in Figure 1 partly in perspective and in cross section a typical form of seal employed for sealing the openings in airplane cabins operating at high altitudes under pressurized conditions. Figure 2 is a cross-section of a similar seal product in modified form.

In the preparation of our sealing material we may employ polyethyl siloxane, polyisopropyl siloxane, et cetera, but we prefer to employ polymethyl siloxane which is an elastomer marketed in various grades under the name of "Silastic." To this material we add about ½ to 2% of an expanding agent which may suitably be a thermally sensitive organic diazo or nitroso compound; for example, we may add about 1% of diazoaminobenzene. Thorough mixing is obtained by milling on squeeze rolls or by other suitable mixing device. The temperature of mixing should not be permitted to rise above ordinary temperatures; for example 100° to 150° F. Instead of the nitrogen compound we may use other expanding agents capable of disengaging gases when heated. Sodium bicarbonate, for example, can be employed. In some cases where a high rate of heating is employed in the expanding step, to be hereinafter described, the dissolved gases in the Silastic are sufficient to effect the desired expansion without addition of any expanding agent.

A curing agent for the polysiloxane is also required. For this purpose various oxidizing agents are used, preferably organic peroxides such as benzoyl peroxide, acetyl peroxide, diethyl peroxy dicarbonate et cetera in amounts of about 0.1 to 5 g.

After uniformly incorporating the expanding agent, the Silastic combination is next formed into approximately the desired shape, for example, by extruding through a die. Thus we may form it into rods or tubes. The resulting extruded product is next heated to activate the expanding agent, thereby forming the polysiloxane into a sort of sponge and greatly increasing its compressibility. It is usually sufficient to heat to a temperature of about 250° to 550° F. for about five to twenty-five minutes. When employing diazoamino benzene a temperature of 400° F. for a period of ten minutes is usually sufficient. However, different grades and different lots of the polysiloxanes material required somewhat different heating times and temperatures which can be readily determined in advance by experiment. It is desirable to control the initial heating—both with respect to temperature attained and rate—to produce a cell structure in which the cell diameter is about $\frac{1}{16}$ inch, with a cell wall thickness of about .002 inch.

After the initial heating, the polysiloxane rubber product now in the form of a soft sponge is covered to provide resistance to abrasion and to increase its strength and general applicability. For this purpose it is preferred to employ a fabric comprised of glass fiber or nylon because of the great strength and durability of these materials and their stability at the required curing temperatures. It is desirable to cement the cover to the polysiloxane sponge by means of a polysiloxane cement which is suitably a dispersion of partially polymerized methylsiloxane in a solvent such as xylene or tetrachlor ethylene. If desired, the covering fabric may be completely impregnated with the cement to increase its durability. Other cements such as Vinylite and rubber, suitably in the form of an emulsion or latex, may be employed but are less desirable because of their lower chemical stability and greater susceptibility to hardening in use at low temperatures.

The drawing shows a section of a sealing material prepared in the form of a cylinder or rope with a web for convenience in fastening. The spongy polysiloxane body 10 is surrounded by a flexible sheathing 11 which is brought together in a seam at 12 and formed into a web 13. A layer of cement 14 attaches the spongy polysiloxane core to the cover which is usually fabric.

After the fabric sheath has been applied to the polysiloxane sponge, the product is subjected to heat in a curing oven usually for about 4 to 12 hours at a temperature of about 300° to 500° F. for the purpose of curing the polysiloxane sponge and preventing it from collapsing under long sustained pressure and deformtaion. The curing treatment also serves to set the Silastic cement employed in attaching the sheath to the core.

In another modification of our invention, we inject the unexpanded composition of polyalkylsiloxane rubber and expander into a suitable sheath before the initial expanding heat treatment, thereby expanding it directly in place. When carried out in this way, the process permits expanding and curing the material in a single heating operation which usually extends for a period of 4 to 12 hours at a temperature of from 300° to 550° F. It is sometimes advantageous when operating in this way to effect the initial expansion at a higher temperature, for example 450° F. and then lower the temperature to 350° F. and hold at that temperature for the remainder of the curing time. According to this modification of the process, the polysiloxane composition containing the expander, id est diamino-azobenzene, can be extruded directly into the sheath in an amount sufficient to slightly more than fill the volume of the sheath on expansion. The sheath may be initially coated on the inside with a suitable cement to provide a firm bond between the sheath fabric and the polysiloxane sponge. Various bonding agents as heretofore described can be employed. However, the use of a bonding agent is not obligatory when operating in this manner inasmuch as there is a tendency for the polysiloxane to become self bonded to the sheath fabric on expansion. Still other types of flexible sheath material use no fabrics at all. For example, we may employ for this purpose an elastic tube of neoprene (polychloroprene) or Buna rubber. In this case it is necessary to insert the cured polysiloxane sponge into the sheath, generally after coating with suitable cement; for example rubber cement or polyvinyl acetate cement to facilitate assembly. If desired, the rubber may be initially expanded by treating with a light hydrocarbon such as benzene or hexane. On evaporation of the hydrocarbon after assembly, the sheath can be shrunk onto the polysiloxane core and the two parts may then be bonded by heating in an oven or autoclave to a temperature sufficient to soften the thermoplastic cement previously applied to the intervening surfaces.

In another modification of our product, a sheath material of polysiloxane film or tubing may be applied to the surface of the polysiloxane rubber sponge; for example, by cementing and wrapping or by intrusion as just hereinabove described. Formation of the sponge within a dense polysiloxane tubular sheath may also be effected by expanding in situ.

It is usually desirable to incorporate one or more inorganic modifying agents or extenders in the mixture of polysiloxane and expanding agent. These inorganic modifying agents generally increase the hardness of the resulting cellular polysiloxane product and reduce excessive flexibility where that is desirable. For this purpose we may employ zinc oxide, alumina gel, bauxite, fuller's earth, any of the numerous forms of iron oxide or ferric oxide such as ochre, rouge, umber, titanium oxide and silica gel. When employing silica gel, we prefer to use the alcogel because of its extremely low density. All of the above inorganic extenders are employed in a finely divided form, generally having a particle size in the range of about 1 to 30 microns. The amount of inorganic extender may vary from about 5 to 40%, usually about 10 to 25%.

In addition to those materials hereinabove described for sheathing the cellular polysiloxane we may employ woven metal fabric such as brass, copper or aluminum wire cloth or a flexible paper cover such as crepe paper. Glass fibre or wire cloth impregnated with elastic polymerized carbofluorides, polyvinyl resins, neoprene or other elastomer can also be used. We may also stiffen or reinforce the web 13 as shown in Figure 2 of the drawing by insertion of a thin metal strip or wire 15. A strip of thin sheet brass, copper, aluminum or zinc may be employed and, if desired, it may be perforated to facilitate fastening. The use of a deformable soft metal strip or wire in the web either completely enclosed or cemented to one face thereof permits the shaping of the sealing material to a form which will be retained during handling.

If desired we may soften the sponge polysiloxane rubber material by squeezing, for example through rollers, after the initial cure and before the final hardening treatment. We prefer to crush the sponge material sufficient to rupture or break a major part of the cell structure, then apply the sheath and proceed with the final heat treatment. The softened product suffers less distortion in the final heating owing to escape of gases from the ruptured cells, and the bond to the sheath is not damaged by expansion.

The product of the invention is characterized by the unique property of maintaining a high degree of compressibility and elasticity over a long period of time and over a wide range of temperatures from about −120° F. to upwards of +400° F. We have found that the gases trapped in the cells of polysiloxane are retained much more persistently than in the case of other elastic materials attempted to be used for this purpose. We believe that the outstanding advantage of our product is due partially to the low rate of diffusion of gases such as nitrogen, oxygen, air and carbon dioxide through the cellular structure of our expanded polysiloxane. We believe further that the incorporation of the expanded polysiloxane material within a sheath resistant to the passage of gases such as cemented or impregnated glass or nylon fabric or within a sheath of rubber, Silastic, neoprene, Buna N, Buna S or other elastomer serves to still further maintain the compressibility of our product and prevent collapse over a long period of time when employed as a sealing agent under conditions where the material is greatly deformed by compressive forces.

Having thus described our invention, what we claim is:

1. The method of making a highly compressible elongated sealing material having a high resistance to permanent deformation and characterized by high retention of its elastic properties at temperatures below −100° F. which comprises incorporating into a polysiloxane elastomer about ½ to 2% of an expansion agent capable of liberating an inert gas when heated, extruding the resulting composition in the form of an elongated core of relatively small cross section, subjecting said extruded core to heating to a temperature of about 250° to 550° F. whereby the polysiloxane is expanded into multicellular form, rupturing the cell walls so that the cells interconnect and are exposed to the atmosphere, cementing to the resulting multicellular polysiloxane core an abrasion resistant sheath stable to heating at 500° F. and thereafter subjecting the resulting assemblage to the action of heat at a temperature in the range of about 300° to 500° F. for a period of about 4 to 12 hours to cure the expanded polysiloxane core.

2. A method of making weatherstrip material suitable for sealing closures in airplane cabins which are subjected to a wide variation in temperature, said method comprising the steps of: (a) compounding an organic polysiloxane elastomer with a setting agent and an expanding agent capable of liberating an inert gas when heated; (b) preforming the stated elastomer mixture into a shape approximating the desired final shape; (c) heating the shaped material to expand it to its final shape in a multicellular condition; (d) crushing said expanded material so as as to rupture the cell walls, interconnect the cells, and expose them to the atmosphere; (e) bonding the resulting polysiloxane sponge inside an abrasion-resistant sheath; and (f) curing said sponge within said sheath by subjecting it to further heating.

3. The method of claim 2 in which the expansion heating step (c) is conducted at temperatures between about 250° F. to about 550° F. for about 5 to 25 minutes, and the curing heating step (f) is conducted at temperatures between about 300° F. and about 500° F. for about 4 to 12 hours.

4. A method for making a sealing material that will flex over a wide range of temperatures from about −100° F. to about +400° F. which includes the following steps: mixing at ordinary room temperatures a silicone rubber, a curing agent for said silicone rubber, fillers, and an expanding agent which gives off an inert gas when heated; forming said mixture into an elongated core; heating said core at about 250° to 550° for about 5 to 25 minutes free of confining molds and other shaping apparatus so that it is free to expand to its own limits as said inert gas is liberated by said expanding agent, thereby producing a structure composed of a large number of isolated cells, each containing said inert gas; crushing the expanded core to rupture the walls of said cells to interconnect them and open them to communication with the outside atmosphere at the ends of said core; cementing the outer walls of said core to a fabric sheath; and then completing the cure of said core within said sheath at an elevated temperature.

5. A method for making weatherstripping material that will flex at temperatures down to about −100° F., which includes the steps of forming a silicone rubber core into a multicellular, generally-cylindrical sponge containing isolated cells; rupturing the cell walls so as to interconnect said cells; sheathing said core; and curing the sheathed core.

6. The method of making a highly compressible sealing material in elongated form and small cross section applicable to the sealing of closures throughout a wide range of temperatures, which comprises: incorporating an expanding agent into a polysiloxane elastomer; extruding the resultant composition into a flexible tubular sheath in an amount sufficient to fill said sheath when expanded; subjecting the resultant product to heat sufficient to expand said polysiloxane; rupturing the walls of the cells formed upon the expansion; and continuing the heating operation until the resulting expanded polysiloxane sponge is effectively cured.

References Cited in the file of this patent

UNITED STATES PATENTS

| Number | Name | Date |
|---|---|---|
| 1,045,234 | Willis et al. | Nov. 26, 1912 |
| 1,397,842 | Netzel | Nov. 22, 1921 |
| 1,939,878 | Davidson | Dec. 19, 1933 |
| 1,940,924 | Taylor | Dec. 26, 1933 |
| 1,958,131 | Davidson | May 8, 1934 |
| 2,102,658 | Weisenburg | Dec. 21, 1937 |
| 2,106,817 | Soule | Feb. 1, 1938 |
| 2,114,308 | McGowan et al. | Apr. 19, 1938 |
| 2,122,372 | Hooper | June 28, 1938 |
| 2,204,622 | Reid | June 18, 1940 |
| 2,459,721 | Poltorak | Jan. 18, 1949 |
| 2,460,795 | Warrick | Feb. 1, 1949 |
| 2,503,003 | Bayonne et al. | Apr. 4, 1950 |
| 2,505,353 | Fisk | Apr. 25, 1950 |
| 2,541,137 | Warrick | Feb. 13, 1951 |
| 2,568,672 | Warrick | Sept. 18, 1951 |

FOREIGN PATENTS

| Number | Country | Date |
|---|---|---|
| 490,461 | Great Britain | Aug. 11, 1938 |

OTHER REFERENCES

Modern Plastics, Dec. 1946, pages 102–104 on Silicone Rubber.